(12) United States Patent
Zeng (10) Patent No.: US 11,727,207 B2
(45) Date of Patent: Aug. 15, 2023

(54) DOCUMENT MARKING METHOD AND DEVICE

(71) Applicant: Beijing Bytedance Network Technology Co., Ltd., Beijing (CN)

(72) Inventor: Qing Zeng, Beijing (CN)

(73) Assignee: Beijing Bytedance Network Technology Co., Ltd., Beijing (CN)

(*) Notice: Subject to any disclaimer, the term of this patent is extended or adjusted under 35 U.S.C. 154(b) by 0 days.

(21) Appl. No.: 17/369,747

(22) Filed: Jul. 7, 2021

(65) Prior Publication Data
US 2021/0334456 A1 Oct. 28, 2021

Related U.S. Application Data

(63) Continuation of application No. PCT/CN2020/087702, filed on Apr. 29, 2020.

(30) Foreign Application Priority Data

May 8, 2019 (CN) .......................... 201910380252.4

(51) Int. Cl.
G06F 40/205 (2020.01)
G06F 16/93 (2019.01)

(52) U.S. Cl.
CPC ............ G06F 40/205 (2020.01); G06F 16/93 (2019.01)

(58) Field of Classification Search
CPC ...... G06F 40/205; G06F 16/93; G06F 16/316; G06F 16/38

(Continued)

(56) References Cited

U.S. PATENT DOCUMENTS 5,873,604 A * 2/1999 Phillips ................. B41M 3/14
283/58
10,826,940 B2 * 11/2020 Narayanaswamy .........................
H04L 63/0281

(Continued)

FOREIGN PATENT DOCUMENTS

CN 101504651 A 8/2009
CN 104966040 A 10/2015

(Continued)

OTHER PUBLICATIONS

International Search Report for Application No. PCT/CN2020/087702, dated Aug. 10, 2020, 6 pages with English Translation.

(Continued)

*Primary Examiner* — Akwasi M Sarpong (57) ABSTRACT

The present disclosure provides a document marking method and device. The method includes: parsing (101) a target document to determine information on each associated user corresponding to the target document; determining (102) an attribute of the target document based on the information on each associated user corresponding to the target document; and marking (103) the target document based on the attribute of the target document. With the method, a document can be marked based on an attribute of the document to attract a user's attention, and to remind the user to pay attention to wording when editing the document, thereby improving information security, and solving a technical problem in the related art that the document cannot be marked.

15 Claims, 4 Drawing Sheets

(58) Field of Classification Search
USPC .................................................. 704/270, 9, 2
See application file for complete search history.

(56) References Cited

U.S. PATENT DOCUMENTS

| | | | |
|---|---|---|---|
| 2008/0215635 A1* | 9/2008 | Shiga | G06F 16/38 |
| 2011/0066966 A1* | 3/2011 | Worrall | G06F 3/0483 |
| | | | 715/776 |
| 2011/0078585 A1* | 3/2011 | King | G06Q 30/02 |
| | | | 715/751 |
| 2012/0331568 A1 | 12/2012 | Weinstein et al. | |
| 2013/0262987 A1* | 10/2013 | Tang | G06F 40/143 |
| | | | 715/239 |
| 2014/0086458 A1* | 3/2014 | Rogers | G10L 15/00 |
| | | | 709/204 |
| 2014/0101094 A1* | 4/2014 | Savage | G06F 16/958 |
| | | | 715/753 |
| 2014/0325331 A1* | 10/2014 | Madireddi | G06F 40/174 |
| | | | 715/224 |
| 2014/0372370 A1* | 12/2014 | Massand | G06F 16/93 |
| | | | 707/608 |
| 2015/0081624 A1* | 3/2015 | Masse | G06Q 10/103 |
| | | | 707/608 |
| 2015/0213284 A1 | 7/2015 | Birkel et al. | |
| 2015/0310188 A1* | 10/2015 | Ford | H04L 63/0428 |
| | | | 726/28 |
| 2015/0379151 A1 | 12/2015 | Chakra et al. | |
| 2016/0063416 A1* | 3/2016 | Sharma | G06Q 10/06313 |
| | | | 705/7.23 |
| 2017/0017779 A1* | 1/2017 | Huang | G06F 21/16 |
| 2017/0075924 A1* | 3/2017 | Rogers | H04W 4/18 |
| 2017/0220546 A1* | 8/2017 | Codrington | G06F 16/2282 |
| 2017/0308610 A1* | 10/2017 | Mullins | G06F 16/38 |
| 2018/0191645 A1* | 7/2018 | Cacioppo | H04L 67/06 |
| 2018/0191805 A1* | 7/2018 | Hurwitz | H04L 67/06 |
| 2018/0260377 A1 | 9/2018 | Theodore et al. | |
| 2018/0335935 A1* | 11/2018 | Larson | G06F 3/04842 |
| 2019/0012053 A1* | 1/2019 | Hawa | G06F 3/0484 |
| 2019/0121875 A1* | 4/2019 | Niu | H04L 65/403 |
| 2019/0138587 A1* | 5/2019 | Silk | G06F 40/197 |
| 2019/0138589 A1* | 5/2019 | Udell | G06F 40/18 |
| 2019/0259377 A1* | 8/2019 | Mertens | G06F 16/638 |
| 2020/0117725 A1* | 4/2020 | Bhattacharya | G06F 16/176 |

FOREIGN PATENT DOCUMENTS

| | | |
|---|---|---|
| CN | 105612547 A | 5/2016 |
| CN | 109710905 A | 5/2019 |
| CN | 110175320 A | 8/2019 |
| JP | 2009187310 A | 8/2009 |

OTHER PUBLICATIONS

Grant Notice dated Jan. 5, 2023 in JP No. 2021-539430, English translation (5 pages).
First Office Action dated Nov. 29, 2022 in CN No. 201910380252.4, English translation (13 pages).
Extended European Search Report dated Feb. 1, 2022 in European Patent Application No. 20801454.8.
Communication Pursuant to Article 94(3) EPC dated Sep. 19, 2022 in European Patent Application No. 20801454.8 (7 pages).
Notice of Reasons for Refusal dated Jul. 12, 2022 in Japanese Patent Application No. 2021-539430 (5 pages), with English translation (5 pages).

* cited by examiner

DOCUMENT MARKING METHOD AND DEVICE

CROSS-REFERENCE TO RELATED APPLICATION

The present application is a continuation of International Application No. PCT/CN2020/087702, filed on Apr. 29, 2020, which claims a priority to Chinese Patent Application No. 201910380252.4, titled "DOCUMENT MARKING METHOD AND DEVICE", and filed by Beijing ByteDance Network Technology Co., Ltd., on May 8, 2019, the entire content of which are hereby incorporated by reference.

TECHNICAL FIELD

The present disclosure relates to the field of Internet application technologies, and more particularly, to a document marking method and device.

BACKGROUND

For companies, the security of information assets is an aspect that companies attach great importance to. Documents are important company assets. The quality of document writing has a great impact on the security of information assets.

Inevitably, there is a need for collaboration between companies to complete documents. As external cooperation is involved, when writing documents, attention should be paid to wording to avoid leaking company secrets. Therefore, marking a collaborative document to remind collaborators to pay attention to the wording can help ensure the security of information assets.

However, currently, there is no technology that can mark collaborative documents. Therefore, it is an urgent technical problem to mark documents for reminding collaborators to pay attention to wording.

SUMMARY

The present disclosure provides a document marking method and device, capable of solving a technical problem in the related that documents cannot be marked.

To this end, in a first aspect of the present disclosure, a document marking method is provided. Information on each associated user corresponding to a target document is obtained. An attribute of the target document is determined based on the information on each associated user. The target document is marked based on the determined attribute. Consequently, a document can be marked based on an attribute of the document to attract a user's attention, and to remind the user to pay attention to wording when editing the document, thereby improving information security.

In a second aspect of the present disclosure, a document marking device is provided.

In a third aspect of the present disclosure, an electronic device is provided.

In a fourth aspect of the present disclosure, a non-transitory computer-readable storage medium is provided.

In a fifth aspect of the present disclosure, a computer program product is provided.

According to an embodiment in the first aspect of the present disclosure, a document marking method is provided. The method includes: parsing a target document to determine information on each associated user corresponding to the target document; determining an attribute of the target document based on the information on each associated user corresponding to the target document; and marking the target document based on the attribute of the target document.

With the document marking method according to the embodiment of the present disclosure, a target document is parsed to determine information on each associated user corresponding to the target document. An attribute of the target document is determined based on the information on each associated user corresponding to the target document. The target document is marked based on the attribute of the target document. Consequently, a document can be marked based on an attribute of the document to attract a user's attention, and to remind the user to pay attention to wording when editing the document, thereby improving information security.

According to an embodiment in the second aspect of the present disclosure, a document marking device is provided. The device includes: a first determination module configured to parse a target document to determine information on each associated user corresponding to the target document; a second determination module configured to determine an attribute of the target document based on the information on each associated user corresponding to the target document; and a marking module configured to mark the target document based on the attribute of the target document.

With the document marking device according to the embodiment of the present disclosure, a target document is parsed to determine information on each associated user corresponding to the target document. An attribute of the target document is determined based on the information on each associated user corresponding to the target document. The target document is marked based on the attribute of the target document. Consequently, a document can be marked based on an attribute of the document to attract a user's attention, and to remind the user to pay attention to wording when editing the document, thereby improving information security.

According to an embodiment in the third aspect of the present disclosure, an electronic device is provided. The electronic device includes a processor and a memory. The processor executes, by reading executable program codes stored in the memory, a program corresponding to the executable program codes, so as to implement the document marking method according an embodiment in the first aspect.

According to an embodiment in the fourth aspect of the present disclosure, a non-transitory computer-readable storage medium is provided. The medium stores a computer program. The program, when executed by a processor, implements the document marking method according to an embodiment in the first aspect.

According to an embodiment in the fifth aspect of the present disclosure, a computer program product is provided. When instructions in the computer program product are executed by a processor, the document marking method according to an embodiment in the first aspect is implemented.

Additional aspects and advantages of the present disclosure will be given at least in part in the following description, or become apparent at least in part from the following description, or can be learned from practicing of the present disclosure.

BRIEF DESCRIPTION OF DRAWINGS

The above and/or additional aspects and advantages of the present disclosure will become more apparent and more understandable from the following description of embodiments taken in conjunction with the accompanying drawings, in which.

DESCRIPTION OF EMBODIMENTS

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

A document marking method and device according to the embodiments of the present disclosure will be described below with reference to the figures.

Figure 1:
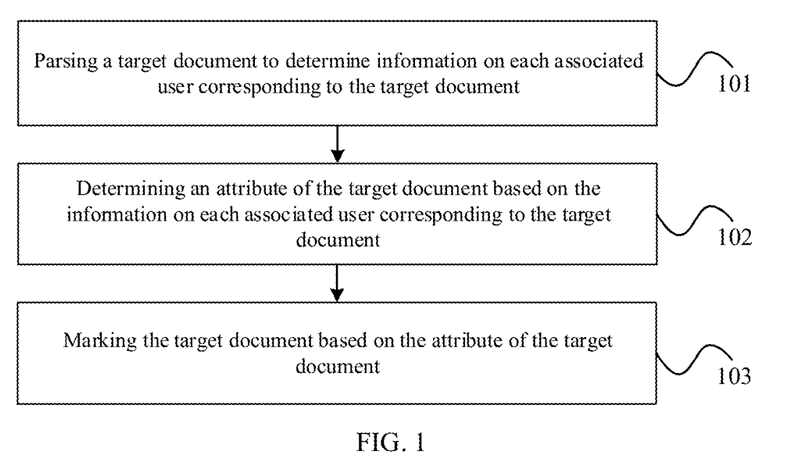
FIG. 1 is a flowchart illustrating a document marking method according to an embodiment of the present disclosure.

FIG. 1 is a flowchart illustrating a document marking method according to an embodiment of the present disclosure. The method can be executed by a document marking device according to an embodiment of the present disclosure. The document marking device can be installed in an electronic device such as a desktop computer, a notebook computer, a smart phone, and a tablet computer.

As illustrated in FIG. 1, the document marking method includes the following steps.

At block 101, a target document is parsed to determine information on each associated user corresponding to the target document.

Each associated user corresponding to the target document may be a collaborator of the target document, and/or a person or a group mentioned in the target document, and/or a person who has an access to the target document, etc. Information on each associated user includes but is not limited to an account of a user, an email address of the user, a company to which the user belongs, and a department in which the user works. User information can be entered by the user in accordance with his/her personal circumstances during registration.

In an embodiment of the present disclosure, for a target document to be marked, the target document may be parsed to obtain the information on each associated user corresponding to the target document.

For example, an operation record of a document usually records a user who edits the document, i.e., a collaborator, and records a user who browses the document, i.e., a reviewer. Therefore, in an embodiment of the present disclosure, the collaborator and the reviewer of the target document can be obtained from the operation record of the target document as associated users corresponding to the target document.

In addition, other users are often mentioned in the document, especially in a collaborative document. A current user may mention a user from another department or another company to remind other users to edit the document in a specific position. For example, user A can be reminded to supplement content in the document in a form of "@UserA". User A can be a name of an individual or a group name of a group. Therefore, in an embodiment of the present disclosure, content of the target document can be parsed to determine whether another user is mentioned in the content of the target document. If so, another user mentioned in the content of the target document is also determined as an associated user corresponding to the target document.

Next, after obtaining the associated user corresponding to the target document, the information on each associated user may be further determined.

As an example, each obtained associated user can be matched with a pre-established user registration information database. The user registration information database stores a corresponding relation between a name of each user and personal information filled in by each user during registration. When each associated user is matched from the user registration information database, the information on each associated user corresponding to each associated user can be obtained.

It is to be noted that when the associated user is a group, information of each user in the group is obtained as associated user information of the associated user.

At block 102, an attribute of the target document is determined based on the information on each associated user corresponding to the target document.

The attribute of the target document includes but is not limited to external (referring to an external company), inter-department (referring to different departments of the same company), intra-department (referring to internal disclosure of a department), and personal (referring to edition and reference available to an author only).

In an embodiment of the present disclosure, after the information on each associated user corresponding to the target document is determined, the attribute of the target document may be determined based on the information on each associated user.

As an example, the attribute of the target document can be determined based on a mailbox in the information on each associated user. Mailboxes of users in the same company have the same suffix. For example, mailbox suffixes of all employees in ByteDance Technology Co., Ltd. are all "@bytedance.com". Therefore, it can be determined whether each associated user belongs to the same company according to a mailbox suffix. If in the information on each associated user, there is at least one associated user whose mailbox suffix is inconsistent with other associated users, the attribute of the target document is determined to be external.

As an example, the attribute of the target document may be determined based on the company and department in the information on each associated user. If the information on each associated user includes different company names, i.e., respective associated users belong to different companies, the attribute of the target document is determined to be external. If each associated user belongs to the same company, it is further determined whether each associated user belongs to the same department. If each associated user does not belong to the same department, the attribute of the target document is determined to be inter-department. If there are multiple associated users, and each associated user belongs to the same department, the attribute of the target document is determined to be intra-department. If the target document corresponds to one associated user, the attribute of the target document is determined to be personal.

At block 103, the target document is marked based on the attribute of the target document.

In an embodiment of the present disclosure, after the attribute of the target document is determined, the target document can be marked based on the attribute of the target document.

In a possible implementation of an embodiment of the present disclosure, marking the target document includes: marking the target document in a document list; and/or marking the target document at a document title of the target document; and/or marking the target document in a display page of a document search result. By marking the document, it is helpful for collaborators to determine the attribute of the document based on a mark when viewing and searching the document, thereby prompting the collaborators to be more cautious when creating an external document.

Figure 2:
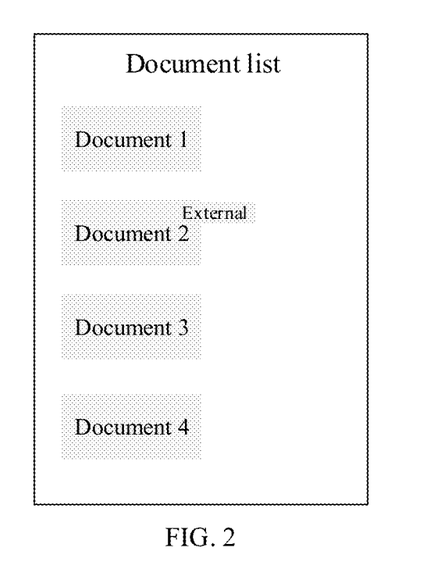
FIG. 2 is a diagram of an example of marking a document in a document list.

As an example, if the attribute of the target document is external, the target document can be marked in the document list. As illustrated in FIG. 2, assuming that the attribute of document 2 is external in a current document list, a mark "External" can be added to an upper right corner of document 2 for marking.

With the document marking device according to the embodiment of the present disclosure, a target document is parsed to determine information on each associated user corresponding to the target document. An attribute of the target document is determined based on the information on each associated user corresponding to the target document. The target document is marked based on the attribute of the target document. Consequently, a document can be marked based on an attribute of the document to attract a user's attention, and to remind the user to pay attention to wording when editing the document, thereby improving information security.

In a possible implementation of an embodiment of the present disclosure, a condition for parsing the target document may be preset. When the preset condition is met, the target document is parsed.

As an example, the preset condition may be obtaining of a collaborative processing request. The collaborative processing request includes an identifier of the target document. Specifically, a function key of "Add a collaborator" can be set in a toolbar of a document editing interface. When the function key is triggered, the collaborative processing request is generated. The document marking device obtains the collaborative processing request. The target document is determined based on the identifier carried in the collaborative processing request, and is parsed.

As an example, the preset condition is obtaining of a configuration information update request. The configuration information update request includes the identifier of the target document. Configuration information is an operation authority of a document. Generally, a default authority of the configuration information of the document is set to be operational to an owner only. When the user modifies the configuration information, the configuration information update request is generated. For example, when the user changes a setting of the configuration information from "Accessible/editable to me only" to "Accessible/editable to all users", a corresponding configuration information update request is generated. The document marking device obtains the configuration information update request, determines the target document corresponding to the identifier based on the identifier carried in the configuration information update request, and parses the target document.

In a possible implementation of an embodiment of the present disclosure, when the operation authority of the target document is obtained as "accessible/editable to all users", the attribute of the target document is determined to be external, and the target document is marked.

As an example, the preset condition is obtaining of a preset operation request in a process of editing the target document. The preset operation request may be, for example, an operation request generated by triggering an "Insert" key in the toolbar of the document editing interface for inserting a link, a user, another document, and the like, or an operation request generated when inputting a preset symbol "@" for adding a user, another document, a file address, and the like. If in the process of editing the target document, the preset operation request is obtained by the document marking device, the document marking device parses the target document.

By parsing the target document only when the preset condition is met, it is realized that only a specific document is parsed, such that a processing cost of the document marking device can be reduced.

In a possible implementation of an embodiment of the present disclosure, the information on each associated user may include a tenant identifier to which each associated user belongs. The tenant identifier is an encrypted string, which can be generated based on company information entered by each associated user during registration. Different users of the same company correspond to the same tenant identifier. Therefore, when it is determined whether the target document is an external document, i.e., when it is determined whether the attribute of the target document is external, determining the attribute of the target document based on the information on each associated user corresponding to the target document includes: determining the attribute of the target document based on a tenant identifier to which each associated user belongs; or determining the attribute of the target document based on a tenant identifier to which each sub-user included in each associated user belongs. Specifically, when each associated user is an individual user, if in the information on each associated user, the tenant identifier to which at least one associated user belongs is inconsistent with the tenant identifiers of other associated users, it is determined that the attribute of the target document is external. When the associated user is a group, if the tenant identifier to which at least one sub-user in the group belongs is inconsistent with the tenant identifiers to which other sub-users in the group belong, it is determined that the attribute of the target document is external. Therefore, determining the attribute of the target document in accordance with a unique tenant identifier corresponding to each company is beneficial to improving an accuracy of document marking.

In a possible implementation of an embodiment of the present disclosure, when the target document corresponds to a first associated user and a second associated user belonging to different tenant identifiers, subsequent to determining the information on each associated user corresponding to the target document, the second associated user may be marked in a display interface of the target document for the first associated user. When tenant identifiers to which the first associated user and the second associated user belong are different, it can be determined that the first associated user and the second associated user belong to different companies. For the first associated user, the second associated user is a user from an external company. Thus, the second associated user can be marked in the display interface of the target document for the first associated user. For example, the mark "External" can be added to the upper right corner of a name of the second associated user for marking. Similarly, in a display interface of the target document for the second associated user, the first associated user is marked. Consequently, by marking, when the target document corresponds to the first associated user and the second associated user belonging to different tenant identifiers, the second associated user in the display interface of the target document for the first associated user, a user from an external company involved in the document is marked.

Further, in a possible implementation of an embodiment of the present disclosure, subsequent to marking the second associated user in the display interface of the target document for the first associated user, it can also be determined whether the second associated user is in a contact list of the first associated user. For example, the name of the second associated user can be matched with a name of each contact in the contact list of the first associated user. If a contact is matched, it is determined that the second associated user is in the contact list of the first associated user. The second associated user in the contact list of the first associated user is marked. In this way, not only marking of the document but also marking of the contact is realized. When a contact is inserted into a document, it is helpful to determine whether the contact is an external contact based on a mark of the contact, thereby reminding an author of a document to pay attention to wording, and improving information security.

In addition, if the second associated user does not exist in the contact list of the first associated user, but the second associated user exists in a group in the contact list of the first associated user, the second associated user is marked in the group, and/or the group is marked in the contact list.

It can be understood that when a user joins a group, a name of the group is displayed in a contact list of the user. Therefore, in a possible implementation of an embodiment of the present disclosure, when a third associated user corresponding to the target document includes a first sub-user and a second sub-user belonging to different tenant identifiers, subsequent to determining the information on each associated user corresponding to the target document, the third associated user may be marked in a contact list of the first sub-user and a contact list of the second sub-user. For example, assuming that the third associated user is a collaborator group that includes two collaborators Z1 and Z2 from different companies, the collaborator group will be displayed in a contact list of Z1 and a contact list of Z2. Since Z1 and Z2 belong to different companies, that is, Z1 and Z2 belong to different tenant identifiers in the collaborator group, the collaborator group is marked in the contact list corresponding to Z1, and the collaborator group is marked in the contact list corresponding to Z2. For example, the mark "External" can be added to the collaborator group. In this way, a group containing users from different companies is marked. Consequently, when the group is mentioned, the user may distinguish the attribute of the group based on the mark of the group, so as to easily identify the external group by the user.

It is to be noted that according to the document marking method provided by the present disclosure, not only the target document and each associated user are marked based on the information on each associated user corresponding to the target document, but also each contact in the contact list is marked based on the tenant identifier to which each contact belongs and the tenant identifier to which each associated user belongs in the contact list corresponding to each associated user, and each group in the contact list is marked based on tenant identifiers that belong to each user and each associated user included in each group in the contact list.

Taking the first associated user as an example, for each contact in the contact list corresponding to the first associated user, a tenant identifier to which each contact belongs is obtained. The tenant identifier to which each contact belongs is matched with the tenant identifier to which the first associated user belongs. If a tenant identifier to which a contact belongs is inconsistent with the tenant identifier to which the first associated user belongs, it is determined that the contact is an external contact, and the contact is marked in the contact list. For a group in the contact list, a tenant identifier to which each user in the group belongs is obtained. The tenant identifier to which each user belongs is matched with the tenant identifier to which the first associated user belongs. If a tenant identifier to which at least one user belongs does not match the tenant identifier to which the first associated user belongs, it is determined that the group is an external group, and the group is marked in the contact list of the first associated user. By marking each contact and each group in the contact list, when a collaborator mentions or invites a contact or a group in a document, the collaborator may, on a basis of the mark, determine whether the mentioned or invited contact is an external collaborator, and determine whether the mentioned or invited group is an external group, thereby achieving a purpose of reminding the collaborator to pay attention to the wording.

Figure 3:
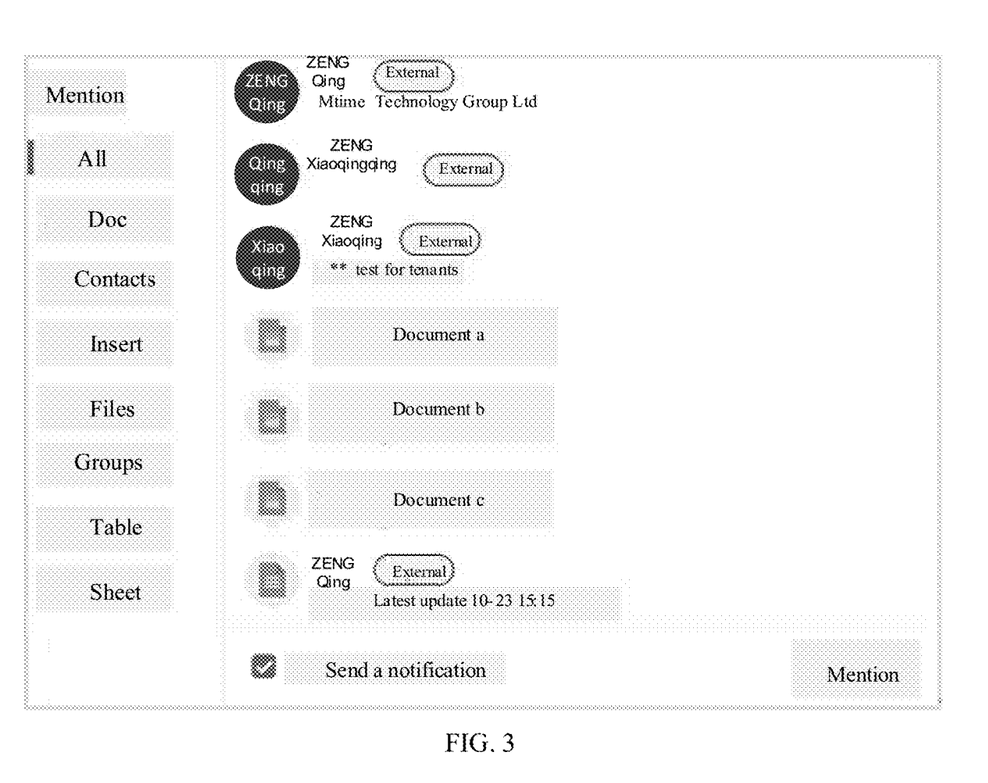
FIG. 3 is a diagram of an example of showing related content in a pop-up window after inputting a preset operation.
Figure 4:
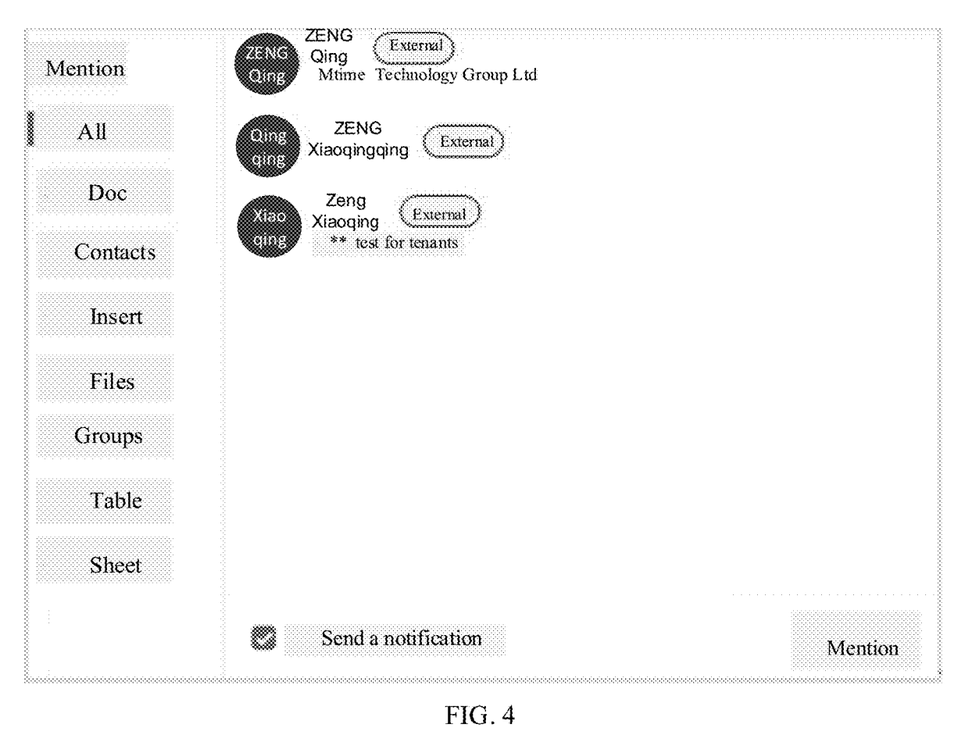
FIG. 4 is a diagram of an example of showing related content in category in a pop-up window.

After contacts or groups in the contact list is marked, if the user performs a preset operation to insert a contact, a group or a document when editing the document, it may be determined, based on information displayed in a pop-up window corresponding to the preset operation, whether a contact to be inserted is an external contact, a group to be inserted is an external group, and a document to be inserted is an external document. The preset operation may be, for example, inputting a preset symbol @, or triggering an "Insert" key in the document editing interface. For example, if user B enters content "@ZENG Qing" when editing a document, a pop-up window as illustrated in FIG. 3 will pop up. As illustrated in FIG. 3, the pop-up window displays all types of content related to the contact "ZENG Qing" to be inserted, including similar contacts and documents related to ZENG Qing. For a contact marked "External", it indicates that the contact and user B belong to different companies. For a document marked "External", it indicates that the document is an external document, that is, the document contains an external collaborator. When user B selects a piece of information, for example, the user selects the contact "ZENG Xiaoqing" and clicks on a "Mention" key, "ZENG Xiaoqing" may be inserted into the document, i.e., content "@ZENG Xiaoqing" is displayed in the document. In the pop-up window as illustrated in FIG. 3, content related to the contact "ZENG Qing" to be inserted may also be displayed in category. For example, when user B clicks on "Contacts" on a left side of the pop-up window, only contacts related to "ZENG Qing" are displayed on a right side of the pop-up window, as illustrated in FIG. 4.

To implement the above embodiments, the present disclosure further provides a document marking device.

Figure 5:
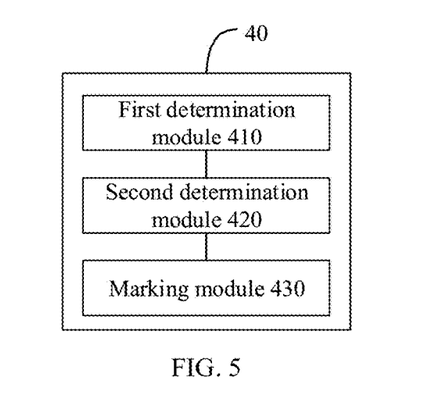
FIG. 5 is a block diagram showing a structure of a document marking device according to an embodiment of the present disclosure.

FIG. 5 is a block diagram showing a structure of a document marking device according to an embodiment of the present disclosure.

As illustrated in FIG. 5, a document marking device 40 includes a first determination module 410, a second determination module 420, and a marking module 430.

The first determination module 410 is configured to parse a target document to determine information on each associated user corresponding to the target document.

In a possible implementation of an embodiment of the present disclosure, the first determination module 410 is configured to parse the target document in response to obtaining a collaborative processing request containing an identifier of the target document; or the first determination module 410 is configured to parse the target document in response to obtaining a configuration information update request containing the identifier of the target document; or the first determination module 410 is configured to parse the target document in response to obtaining a preset operation request in a process of editing the target document.

The second determination module 420 is configured to determine an attribute of the target document based on the information on each associated user corresponding to the target document.

In a possible implementation of an embodiment of the present disclosure, the second determination module 420 is specifically configured to: determine the attribute of the target document based on a tenant identifier to which each associated user belongs; or determine the attribute of the target document based on a tenant identifier to which each sub-user included in each associated user belongs.

The marking module 430 is configured to mark the target document based on the attribute of the target document.

In a possible implementation of an embodiment of the present disclosure, the marking module 430 is specifically configured to: mark the target document in a document list; and/or mark the target document at a document title of the target document; and/or mark the target document in a display page of a document search result.

In a possible implementation of an embodiment of the present disclosure, the marking module 430 is further configured to, when the target document corresponds to a first associated user and a second associated user belonging to different tenant identifiers, mark the second associated user in a display interface of the target document for the first associated user.

In a possible implementation of an embodiment of the present disclosure, the marking module 430 is further configured to mark, when the second associated user is in a contact list of the first associated user, the second associated user in the contact list of the first associated user.

In a possible implementation of an embodiment of the present disclosure, the marking module 430 is further configured to, when a third associated user corresponding to the target document includes a first sub-user and a second sub-user belonging to different tenant identifiers, mark the third associated user in a contact list of the first sub-user and a contact list of the second sub-user.

It is to be noted that the above description of the embodiments of the document marking method is also applicable to the document marking device according to the embodiments, and thus details thereof will not be repeated here.

With the document marking device according to the embodiment of the present disclosure, a target document is parsed to determine information on each associated user corresponding to the target document. An attribute of the target document is determined based on the information on each associated user corresponding to the target document. The target document is marked based on the attribute of the target document. Consequently, a document can be marked based on an attribute of the document to attract a user's attention, and to remind the user to pay attention to wording when editing the document, thereby improving information security.

To implement the above embodiments, the present disclosure further provides an electronic device. The electronic device includes a processor and a memory. The processor executes, by reading executable program codes stored in the memory, a program corresponding to the executable program codes, so as to implement the document marking method according to the above embodiments.

Figure 6:
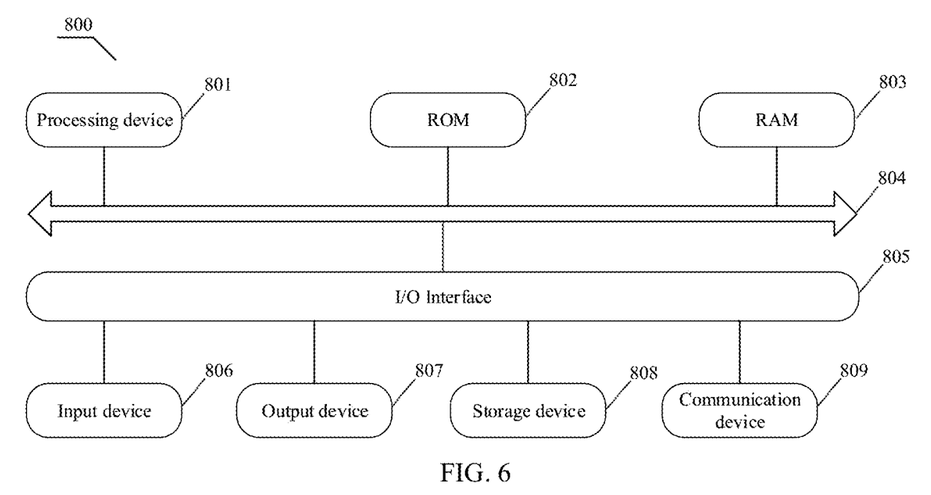
FIG. 6 is a block diagram showing a structure of an electronic device configured to implement an embodiment of the present disclosure.

Reference is now made to FIG. 6, which is a block diagram showing an electronic device 800 configured to implement the embodiments of the present disclosure. The electronic device according to the embodiment of the present disclosure may include, but not limited to, a mobile terminal such as a mobile phone, a laptop computer, a digital broadcast receiver, a Personal Digital Assistant (PDA), a tablet computer, a Portable Multimedia Player (PMP), or a vehicle-mounted terminal (e.g., a vehicle-mounted navigation terminal), or a fixed terminal such as a digital TV, a desktop computer, etc. The electronic device illustrated in FIG. 6 is exemplary only, and should not be construed as limiting the function and scope of use of the embodiments of the present disclosure.

As illustrated in FIG. 6, the electronic device 800 may include a processing device (such as a central processing unit, a graphics processing unit, etc.) 801, which may perform various appropriate actions and processes in accordance with programs stored in a Read Only Memory (ROM) 802 or loaded from a storage device 808 into a Random Access Memory (RAM) 803. In the RAM 803, various programs and data required for operation of the electronic device 800 may also be stored. The processing device 801, the ROM 802, and the RAM 803 are connected to each other through a bus 804. An Input/Output (I/O) interface 805 is also connected to the bus 804.

Generally, the following devices may be connected to the I/O interface 805: an input device 806 including, for example, a touch screen, a touch pad, a keyboard, a mouse, a camera, a microphone, an accelerometer, a gyroscope, etc.; an output device 807 including, for example, a Liquid Crystal Display (LCD), a speaker, an oscillator, etc.; the storage device 808 including, for example, a magnetic tape or a hard disk; and a communication device 809. The communication device 809 may allow the electronic device 800 to perform wireless or wired communication with other devices for data exchange. Although FIG. 6 illustrates the electronic device 800 having various devices, it can be appreciated that it is not necessary to implement or provide all the illustrated devices. Alternatively, more or fewer devices may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a computer-readable medium. The computer program includes program codes for implementing the method illustrated in any of the flowcharts. In these embodiments, the computer program may be downloaded and installed from a network through the communication device 809, or installed from the storage device 808, or installed from the ROM 802. When the computer program is executed by the processing device 801, the above-mentioned functions defined in the methods according to the embodiments of the present disclosure are performed.

It is to be noted that the above computer-readable medium in the present disclosure may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, which may transmit, propagate, or transfer programs used by or used with an instruction execution system, apparatus or device. The program codes stored on the computer-readable medium may be transmitted via any appropriate medium, including but not limited to electric cable, optical cable, Radio Frequency (RF), or any suitable combination thereof.

The above computer-readable medium may be included in the above electronic device; or may be standalone without being assembled into the electronic device.

The above computer-readable medium may carry one or more programs which, when executed by the electronic device, cause the electronic device to: parse a target document to determine information on each associated user corresponding to the target document; determine an attribute of the target document based on the information on each associated user corresponding to the target document; and mark the target document based on the attribute of the target document.

The computer program codes for implementing the operations according to the embodiments of the present disclosure may be written in one or more programming languages or any combination thereof. The programming languages may include object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of network, including a Local Area Network (LAN) or a Wide Area Network (WAN), or to an external computer (e.g., over the Internet by using an Internet service provider).

The flowcharts and block diagrams in the figures illustrate architectures, functions, and operations of possible implementations of systems, methods, and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It is also to be noted that, in some alternative implementations, functions showed in blocks may occur in a different order from the order shown in the figures. For example, two blocks illustrated in succession may actually be executed substantially in parallel with each other, or sometimes even in a reverse order, depending on functions involved. It is also to be noted that each block in the block diagrams and/or flowcharts, or any combination of the blocks in the block diagrams and/or flowcharts, may be implemented using a dedicated hardware-based system that is configured to perform specified functions or operations or using a combination of dedicated hardware and computer instructions.

Units involved and described in the embodiments of the present disclosure may be implemented in software or hardware. A name of a module does not constitute a limitation on the module itself under certain circumstances. For example, a marking module may also be described as "a module configured to mark a target document based on an attribute of the target document".

To implement the above embodiments, an embodiment of the present disclosure provides a non-transitory computer-readable storage medium. The non-transitory computer-readable storage medium stores a computer program. The computer program, when executed by a processor, implements the document marking method as described in the above embodiments.

Figure 7:
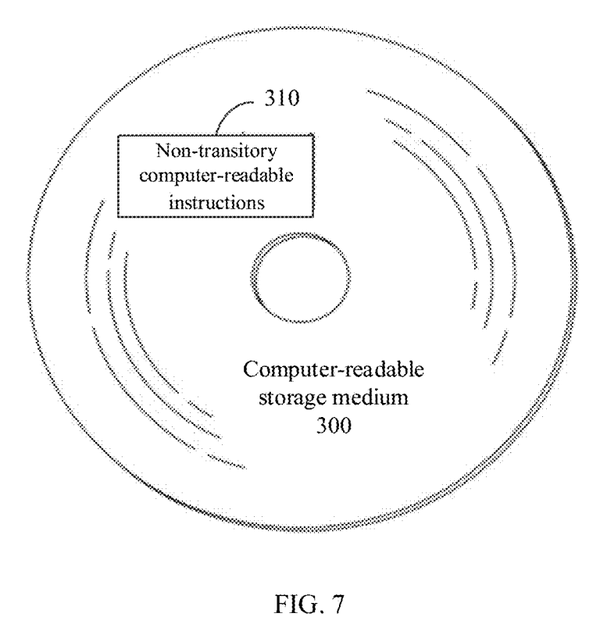
FIG. 7 is a schematic diagram showing a computer-readable storage medium according to an embodiment of the present disclosure.

FIG. 7 is a schematic diagram showing a computer-readable storage medium according to an embodiment of the present disclosure. As illustrated in FIG. 7, a computer-readable storage medium 300 according to the embodiment of the present disclosure has non-transitory computer-readable instructions 310 stored thereon. The non-transitory computer-readable instructions 310, when executed by a processor, implements all or part of the steps of the document marking method according to the above embodiments of the present disclosure.

To implement the above embodiments, the present disclosure also provides a computer program product. When instructions in the computer program product are executed by a processor, the document marking method according to the above embodiments is implemented.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

In addition, terms such as "first" and "second" are used herein for purposes of description only and are not intended to indicate or imply relative importance, or to implicitly show the number of technical features indicated. Thus, the feature defined with "first" and "second" may explicitly or implicitly include one or more this feature. In the description of the present disclosure, "a plurality of" means at least two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations. Functions may be executed in a different order from the illustrated or discussed order, and may be executed, depending on functions involved, substantially in parallel with each or in a reverse order, which should be understood by those skilled in the art of the embodiments of the present disclosure.

The logic and/or step described in other manners herein or illustrated in the flow chart, for example, a particular sequence table of executable instructions for realizing the logical function, may be specifically achieved in any computer readable medium to be used by the instruction execution system, apparatus or device (such as the system based on computers, the system including processors or other systems capable of obtaining the instruction from the instruction execution system, apparatus and device and executing the instruction), or to be used in combination with the instruction execution system, apparatus and device. In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in a memory of a computer.

It should be understood that each part of the present disclosure may be realized by hardware, software, firmware or their combination. In the above embodiments, a plurality of steps or methods may be realized by the software or firmware stored in the memory and executed by an appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a Programmable Gate Array (PGA), a Field Programmable Gate Array (FPGA), etc.

It can be understood by those skilled in the art that all or a part of the steps of the method according to the above embodiments may be completed by relevant hardware instructed by a program. The program may be stored in a computer readable storage medium. When the program is executed, one or a combination of the steps of the method according to the above embodiments may be performed.

In addition, individual functional units in the embodiments of the present disclosure may be integrated in one processing module or may be separately physically present, or two or more units may be integrated in one module. The integrated module as described above may be achieved in a form of hardware, or may be achieved in a form of a software functional module. If the integrated module is achieved in the form of a software functional module and sold or used as a separate product, the integrated module may also be stored in a computer readable storage medium.

The storage medium mentioned above may be a read-only memory, a magnetic disk or a CD, etc. Although the embodiments of the present disclosure have been shown and described above, it is to be appreciated that the above embodiments are exemplary, and cannot be construed to limit the present disclosure. Those skilled in the art may make changes, modifications, substitutions, and variation to the above embodiments within scope of the present disclosure.

What is claimed is:

1. A document marking method, comprising:
receiving a collaborative processing request containing an identifier of a target document;
in response to the collaborative processing request being accepted by at least one of a plurality of associated users corresponding to the target document, parsing the target document to determine information on each of the plurality of associated users corresponding to the target document;
determining an attribute of the target document based on the information on each of the plurality of associated users corresponding to the target document; and
marking the target document based on the attribute of the target document,
wherein marking the target document based on the attribute of the target document comprises:
adding to an upper right corner of the target document a mark indicating that one of the plurality of associated users corresponding to the target document is an external user.

2. The method according to claim 1, further comprising, prior to parsing the target document obtaining one of:
a configuration information update request containing the identifier of the target document; and
a preset operation request in a process of editing the target document.

3. The method according to claim 1, wherein marking the target document further comprises one or more of:
marking the target document in a document list;
marking the target document at a document title of the target document; and
marking the target document in a display page of a document search result.

4. The method according to claim 1, wherein determining the attribute of the target document based on the information on each of the plurality of associated users corresponding to the target document comprises:
determining the attribute of the target document based on a tenant identifier to which each of the plurality of associated users belongs; or
determining the attribute of the target document based on a tenant identifier to which each sub-user comprised in each associated user belongs.

5. The method according to claim 4, wherein when a third associated user corresponding to the target document comprises a first sub-user and a second sub-user belonging to different tenant identifiers, the method further comprises:
subsequent to said determining the information on each associated user corresponding to the target document, marking the third associated user in a contact list of the first sub-user and a contact list of the second sub-user.

6. The method according to claim 4, wherein when the target document corresponds to a first associated user and a second associated user belonging to different tenant identifiers, the method further comprising:

subsequent to determining the information on each associated user corresponding to the target document, marking the second associated user in a display interface of the target document for the first associated user.

7. The method according to claim 6, further comprising:
subsequent to marking the second associated user in the display interface of the target document for the first associated user, marking the second associated user in a contact list of the first associated user when the second associated user is in the contact list of the first associated user.

8. An electronic device, comprising:
a processor; and
a memory, storing executable program codes that, when executed by the processor, cause the electronic device to:
receive a collaborative processing request containing an identifier of a target document;
in response to the collaborative processing request being accepted by at least one of a plurality of associated users corresponding to the target document, parse the target document to determine information on each of the plurality of associated users corresponding to the target document;
determine an attribute of the target document based on the information on each of the plurality of associated users corresponding to the target document; and
mark the target document based on the attribute of the target document,
wherein marking the target document based on the attribute of the target document comprises:
adding to an upper right corner of the target document a mark indicating that one of the plurality of associated users corresponding to the target document is an external user.

9. The electronic device according to claim 8, further comprising executable program codes that, when executed by the processor, cause the electronic device to:
prior to said parsing the target document, obtain one of:
a configuration information update request containing the identifier of the target document; and
a preset operation request in a process of editing the target document.

10. The electronic device according to claim 8, wherein marking the target document further comprises one or more of:
marking the target document in a document list;
marking the target document at a document title of the target document; and
marking the target document in a display page of a document search result.

11. The electronic device according to claim 8, wherein determining the attribute of the target document based on the information on each of a plurality of associated users corresponding to the target document comprises:
determining the attribute of the target document based on a tenant identifier to which each of a plurality of associated users belongs; or
determining the attribute of the target document based on a tenant identifier to which each sub-user comprised in each of a plurality of associated users belongs.

12. The electronic device according to claim 11, wherein when a third associated user corresponding to the target document comprises a first sub-user and a second sub-user belonging to different tenant identifiers and further comprising executable program codes that, when executed by the processor, cause the electronic device to:
subsequent to said determining the information on each associated user corresponding to the target document, mark the third associated user in a contact list of the first sub-user and a contact list of the second sub-use.

13. The electronic device according to claim 11, wherein when the target document corresponds to a first associated user and a second associated user belonging to different tenant identifiers and further comprising executable program codes that, when executed by the processor, cause the electronic device to:
subsequent to determining the information on each of a plurality of associated users corresponding to the target document, mark the second associated user in a display interface of the target document for the first associated user.

14. The electronic device according to claim 13, further comprising executable program codes that, when executed by the processor, cause the electronic device to:
subsequent to marking the second associated user in the display interface of the target document for the first associated user, mark the second associated user in a contact list of the first associated user when the second associated user is in the contact list of the first associated user.

15. A non-transitory computer-readable storage medium having a computer program stored thereon, wherein the program, when executed by a processor, implements the document marking method according to claim 1.

* * * * *